United States Patent
Frenne et al.

(10) Patent No.: US 12,003,434 B2
(45) Date of Patent: *Jun. 4, 2024

(54) PRB BUNDLING EXTENSION

(71) Applicant: Telefonaktiebolaget LM Ericsson (publ), Stockholm (SE)

(72) Inventors: Mattias Frenne, Uppsala (SE); Robert Baldemair, Solna (SE); Martin Hessler, Linköping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 6 days.

This patent is subject to a terminal disclaimer.

(21) Appl. No.: 17/831,990

(22) Filed: Jun. 3, 2022

(65) Prior Publication Data
US 2022/0303077 A1 Sep. 22, 2022

Related U.S. Application Data

(63) Continuation of application No. 16/309,861, filed as application No. PCT/EP2018/076869 on Oct. 2, 2018, now Pat. No. 11,374,707.

(60) Provisional application No. 62/566,925, filed on Oct. 2, 2017.

(51) Int. Cl.
| | |
|---|---|
| *H04L 5/00* | (2006.01) |
| *H04B 7/0456* | (2017.01) |
| *H04L 25/02* | (2006.01) |
| *H04W 72/0446* | (2023.01) |
| *H04W 72/23* | (2023.01) |

(52) U.S. Cl.
CPC ........ *H04L 5/0023* (2013.01); *H04B 7/0456* (2013.01); *H04L 25/0204* (2013.01); *H04W 72/0446* (2013.01); *H04W 72/23* (2023.01)

(58) Field of Classification Search
CPC ............. H04B 7/0456; H04L 25/0204; H04W 72/0446; H04W 72/23
See application file for complete search history.

(56) References Cited

U.S. PATENT DOCUMENTS

| | | | | |
|---|---|---|---|---|
| 2018/0324760 A1* | 11/2018 | Yuk | ........................ | H04L 5/0048 |
| 2020/0076484 A1* | 3/2020 | Noh | ........................ | H04B 7/0404 |
| 2020/0146035 A1* | 5/2020 | Kim | ........................ | H04L 5/0044 |

OTHER PUBLICATIONS

3GPP TSG RAN WG1 Meeting NR#3; Nagoya, Japan; Source: LG Electronics; Title: Discussion on PRB bundling (R1-1715854)—Sep. 18-21, 2017.

(Continued)

*Primary Examiner* — John D Blanton
(74) *Attorney, Agent, or Firm* — Baker Botts L.L.P.

(57) ABSTRACT

According to certain embodiments, a transmitting node for transmitting data to a receiving node is provided. The transmitting node is operable at least in a dynamic bundling size mode and includes a communication interface and processing circuitry. The processing circuitry is configured, when operating in the dynamic bundling size mode, to provide the receiving node with an indication of bundling control information representing at least a number L of slots. The processing circuitry transmits data in L consecutive slots using a constant first precoding setting and transmit data in subsequent L consecutive slots using a constant second precoding setting. The first and second precoding settings are independently assignable.

26 Claims, 12 Drawing Sheets

(56) References Cited

OTHER PUBLICATIONS

3GPP TSG RAN WG1 Meeting NR#3; Nagoya, Japan; Source: Intel Corporation; Title: on PRB Bundling for DL (R1-1716288)—Sep. 18-21, 2017.
3GPP TSG RAN WG1 NR Ad hoc #3; Nagoya, Japan; Source: vivo; Title: Summary of Issues on DL PRB bundling and Offline Agreement (R1-1716879)—Sep. 18-21, 2017.
European Patent Office, PCT, Notification of Transmittal of the International Search Report and the Written Opinion of the International Searching Authority, or the Declaration; International Application No. PCT/EP2018076869, by Applicant, Telefonaktiebolaget (Publ); dated Jan. 7, 2019; 12 pages.
LG Electronics, "PRB Bundling in LTE-Advanced," 3GPP TSG RAN WG1 Meeting #61, Montreal, Canada, May 10-14, 2010, #R1-102719, 5 pages.
Xinwei, "Further discussion on DL PRB Bundling," 3GPP TSG-RAN WG1 NR#2, Qingdao, China, Jun. 27-30, 2017, #R1-1709905, 11 pages.
European Patent Office Examination Report in EP Application No. 18 782 418.0-1205 dated Oct. 4, 2021.
"Continuous precoding of NR DRS in time domain," 3GPP TSG RAN WG1 Meeting #88, R1-1702913, Feb. 13-17, 2017.

\* cited by examiner

PRB BUNDLING EXTENSION

PRIORITY

This application is a continuation, under 35 U.S.C. § 120, of U.S. patent application Ser. No. 16/309,861 filed on Dec. 13, 2018 which is a U.S. National Stage Filing under 35 U.S.C. § 371 of International Patent Application Serial No. PCT/EP2018/076869 filed Oct. 2, 2018, and entitled "PRB BUNDLING EXTENSION" which claims priority to U.S. Provisional Patent Application No. 62/566,925 filed Oct. 2, 2017, both of which are hereby incorporated by reference in their entirety.

TECHNICAL FIELD

Particular embodiments are directed to wireless communications and, more particularly, to an extension of physical resource block (PRB) bundling.

INTRODUCTION

Third Generation Partnership Project (3GPP) long term evolution (LTE) and new radio (NR) include physical resource block (PRB) bundling. PRB bundling groups adjacent resource blocks (RB) together. The gNB may use the same transmission precoder across all RBs in the RB bundle (also known as a precoder resource block group (PRG)). The UE can use all the demodulation reference signals (DMRS) in the RB bundle when performing channel estimation, which improves performance. An example is illustrated in FIG. 1. More specifically, the fact that multiple DMRS from different RBs represent the same channel provides the channel estimation with more input data, which improves accuracy.

FIG. 1 is a graph illustrating channel estimation error as a function of signal to noise ratio (SNR) for various bundle sizes. The horizontal axis represents SNR and the vertical axis represents relative channel estimate error in dB. The graph illustrates results for four PRB bundle sizes.

On the other hand, spatial transmit diversity can enhance the transmission in some cases when the CSI feedback is outdated and channel knowledge at the transmitter is unknown. In this case the transmitter changes the precoder between one bundle to the next. The precoders may be changed in an open-loop fashion, that is, without requiring feedback from the receiving party. In this use case, it is beneficial from a spatial diversity point of view with a smaller bundle size because a larger number of different precoders can be used across the scheduling bandwidth (i.e., more spatial diversity may be achieved).

Depending on which use case is targeted, the best PRB bundling size may vary. To provide flexibility supporting different use cases, NR may dynamically switch between two pre-configured PRB bundling sizes. Thus, the DCI may contain 1 bit of PRB bundling information. A UE may receive radio resource control (RRC) signaling to enable or disable dynamic switching of PRB bundling sizes.

Moreover, slot aggregation and/or multi-slot scheduling is supported in NR, in which case the receiver can use DMRS across multiple slots to improve the channel estimate. In slot aggregation one transport block (TB) is mapped to multiple slots effectively decreasing the code rate. In multi-slot scheduling one TB is transmitted in each slot.

A particular problem in NR is how to perform channel estimation when a UE is scheduled in multiple slots by using slot aggregation or multi-slot scheduling (i.e., the UE knows it will receive data in multiple slots and can thus utilize this) and at the same time achieve spatial diversity gain.

SUMMARY

According to certain embodiments, a transmitting node for transmitting data to a receiving node is provided. The transmitting node is operable at least in a dynamic bundling size mode and includes a communication interface and processing circuitry. The processing circuitry is configured, when operating in the dynamic bundling size mode, to provide the receiving node with an indication of bundling control information representing at least a number L of slots. The processing circuitry transmits data in L consecutive slots using a constant first precoding setting and transmit data in subsequent L consecutive slots using a constant second precoding setting. The first and second precoding settings are independently assignable.

According to certain embodiments, a receiving node for receiving data from a transmitting node is provided. The receiving node is operable at least in a dynamic bundling size mode and includes a communication interface and processing circuitry. The processing circuitry is configured to obtain an indication of bundling control information representing at least a number L of slots. In response to receiving the indication of the bundling control information, the processing circuitry operates in a dynamic bundling size mode. While in the dynamic bundling size mode, the processing circuitry receives data from the transmitting node in L consecutive slots assuming that the transmitting node has applied a constant first precoding setting. While in the dynamic bundling size mode, the processing circuitry also receives data from the transmitting node in subsequent L consecutive slots assuming that the transmitting node has applied a constant second precoding setting. The first and second precoding settings are independently assignable.

According to certain embodiments, a method by a transmitting node is provided for transmitting data to a receiving node. The method includes, when operating in the dynamic bundling size mode, providing the receiving node with an indication of bundling control information representing at least a number L of slots, transmitting data in L consecutive slots using a constant first precoding setting, and transmitting data in subsequent L consecutive slots using a constant second precoding setting. The first and second precoding settings are independently assignable.

According to certain embodiments, a method by a receiving node is provided for receiving data from a transmitting node. The method includes obtaining an indication of bundling control information representing at least a number L of slots. In response to receiving the indication of the bundling control information, the receiving node operates in a dynamic bundling size mode. While in the dynamic bundling size mode, data is received from the transmitting node in L consecutive slots assuming that the transmitting node has applied a constant first precoding setting. While in the dynamic bundling size mode, data is received from the transmitting node in subsequent L consecutive slots assuming that the transmitting node has applied a constant second precoding setting. The first and second precoding settings are independently assignable.

Particular embodiments may include some, all, or none of the following advantages. For example, particular embodiments may, in the downlink, flexibly switch between using the same precoder across the multi slots, or changing the precoder across slots in the multi-slot scheduling or slot aggregation, depending on if the CSI is fresh or outdated, which improves robustness and performance of the downlink transmission.

In uplink, the gNB can flexibly switch between granting the UE to use the same precoder across the multi slots, or if the UE is free to change the precoder across slots in the multi-slot scheduling or slot aggregation, depending on (e.g., mobility and SNR), which improves robustness and performance of the uplink transmission.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Certain embodiments disclosed herein obviate the problems described above and include dynamic signalling for whether a user equipment (UE) may use cross slot channel estimation in the downlink. This enables a network node, such as a gNB, to flexibly switch between using the same precoder across the multiple slots that are scheduled together, or changing the precoder in each slot in the multi-slot scheduling or slot aggregation, depending on if the channels state indicator (CSI) is fresh or outdated (e.g., in case the gNB would like to cycle the co-phasing between the polarizations from slot to slot). Particular embodiments may improve robustness and performance of the downlink transmission.

Likewise, in the uplink, a network node, such as a gNB signals to the UE in the uplink grant in case of slot aggregation or multi slot scheduling whether the UE should use the same precoder across the scheduled multi slots, or if the UE may change the precoder in each slot in the multi-slot scheduling. Particular embodiments may improve robustness and performance of the downlink transmission.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 2-11 of the drawings, like numerals being used for like and corresponding parts of the various drawings. LTE and 5G new radio (NR) are used throughout this disclosure as an example cellular system, but the ideas presented herein may apply to other wireless communication systems as well.

Figure 1:
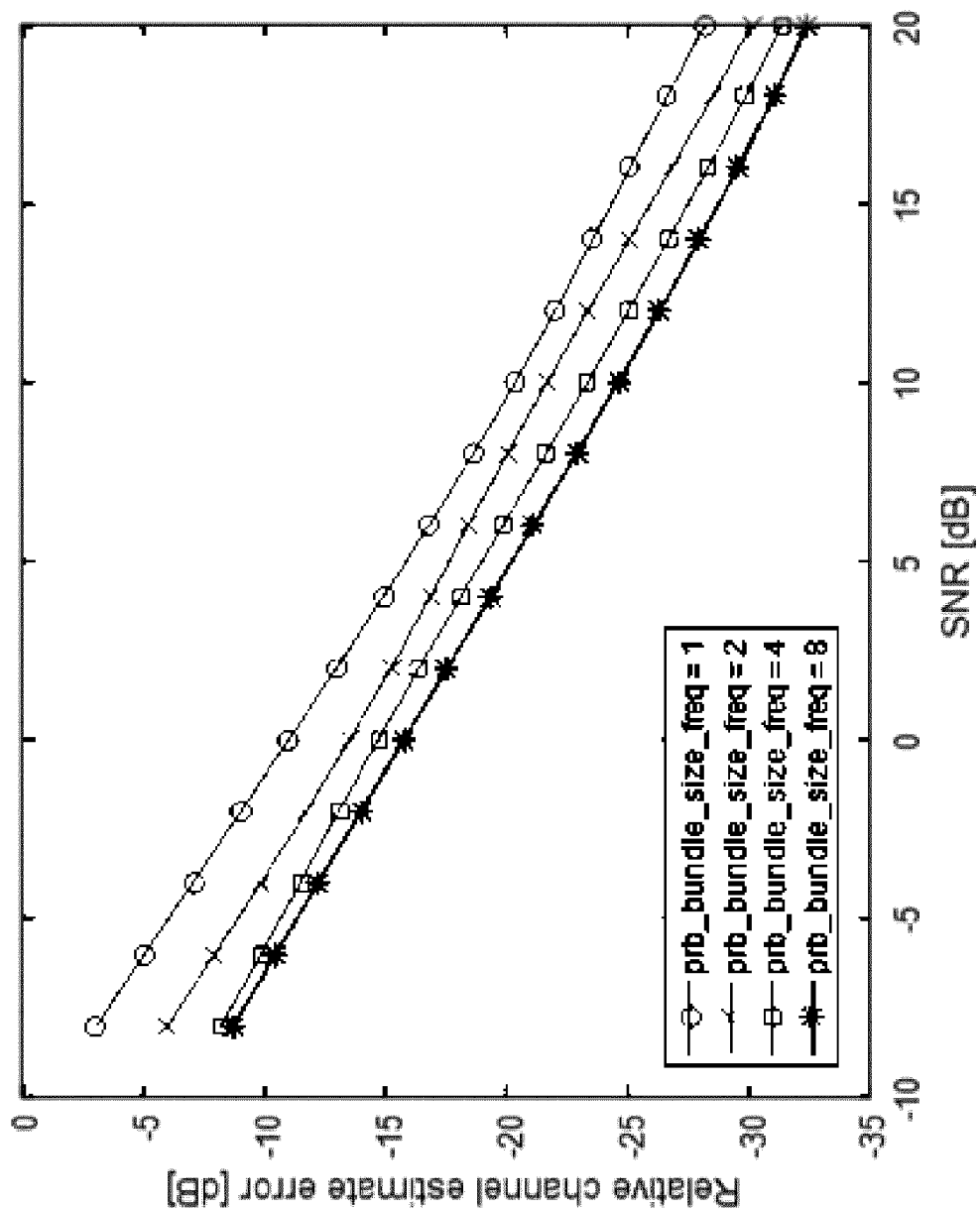
FIG. 1 is a graph illustrating channel estimation error as a function of signal to noise ratio (SNR) for various bundle sizes.
Figure 2:
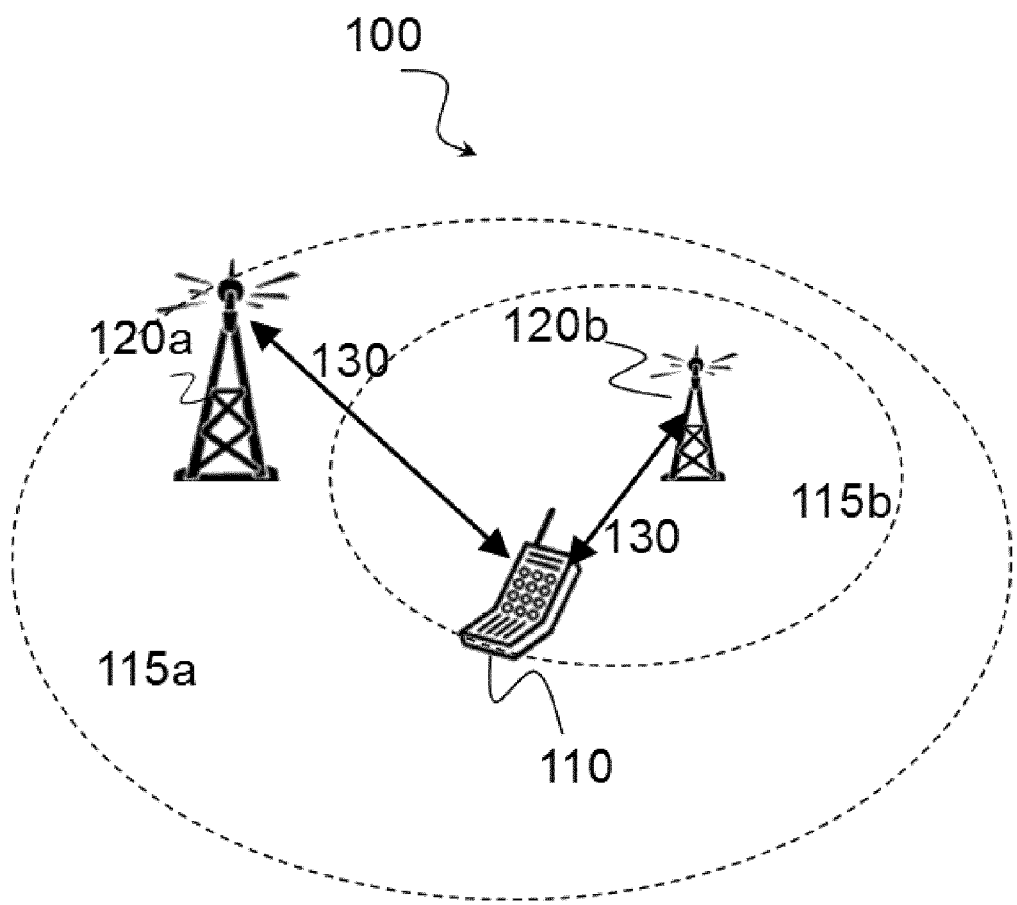
FIG. 2 is a block diagram illustrating an example wireless network, according to certain embodiments.

FIG. 2 is a block diagram illustrating an example wireless network, according to certain embodiments. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multi-input multi-output (MIMO) system. Wireless signal 130 may comprise one or more beams. Particular beams may be beamformed in a particular direction. Each wireless device 110 may have a single receiver or multiple receivers for receiving signals 130 from network nodes 120 or other wireless devices 110. Wireless device 110 may receive one or more beams comprising wireless signal 130.

Wireless signals 130 may be transmitted on time-frequency resources. The time-frequency resources may be partitioned into radio frames, subframes, slots, and/or mini-slots. Network node 120 may dynamically schedule subframes/slots/mini-slots as uplink, downlink, or a combination uplink and downlink Different wireless signals 130 may comprise different transmission processing times.

Network node 120 may operate in a licensed frequency spectrum, such as an LTE spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform LBT protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially, or may not overlap at all.

In particular embodiments, wireless device 110 and network nodes 120 may perform carrier aggregation. For example, network node 120a may serve wireless device 110 as a PCell and network node 120b may serve wireless device 110 as a SCell. Network nodes 120 may perform self-scheduling or cross-scheduling. If network node 120a is operating in licensed spectrum and network node 120b is operating in unlicensed spectrum, network node 120a may provide license assisted access to the unlicensed spectrum (i.e., network node 120a is a LAA PCell and network node 120b is a LAA SCell).

In particular embodiments, wireless signals 130 may include reference signals. Wireless device 110 may measure the reference signals to determine a channel quality. Wireless device 110 may report the received channel quality to network node 120. Network node 120 may adapt a modulation and coding scheme for transmitting wireless signals 130 to wireless device 110 based on the received channel quality report.

In some embodiments, network node 120 may group adjacent resource blocks together and use the same transmission precoder across all RBs in the RB bundle (referred to as a precoder resource block group (PRG), as described in the Introduction section above. Wireless device 110 may estimate a channel quality based on multiple reference signals in the PRG. Network node 120 may dynamically signal (e.g., via RRC) a PRG configuration to wireless device 110. Further details are described below and with respect to FIGS. 3-5.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 6A below. Similarly, a network node may include any suitable combination of hardware and/or software. For example, in particular embodiments, a network node, such as network node 120, may include the components described with respect to FIG. 7A below.

In general, particular embodiments target multi-slot/slot aggregation and the use of dynamic switching for both uplink and downlink. For downlink, the downlink control information (DCI) that schedules a multi-slot transmission or a slot aggregated transmission contains information on whether or not the UE may assume that the same transmit precoder is used across multiple slots. This can be specified in several different ways: (a) the UE can assume that the same transmit precoder is used across the multiple slots for which it receives PDSCH, (b) the UE may assume that it can perform channel estimation on DMRS present in each of the multiple slots for which it receives PDSCH; or (c) the UE may assume that the DMRS port x in slot n is the same port as DMRS port x in slot n+1 where n and n+1 are two different slots in the multiple slots for which it receives PDSCH NR supports a 1 bit PRB bundling indicator, but so far bundling is limited to a single slot only. The bundling indicator can thus switch between two states which can be configured by RRC.

In particular embodiments, the PRB bundling definition is extended to the time dimension as well. Accordingly, a PRB bundle consists of K resource blocks and L slots and thus the two states indicated by DCI may include: State 1 where K=4, L=1; and State 2 where K=4, and L=4

Thus, in particular embodiments, the 1 bit indicator in DCI switches both the frequency domain and the time domain assumption jointly. If State 2 is indicated, then the UE may utilize the channel estimates on DMRS across the slot boundaries for the 4 slots and across 4 RBs It may be so that the multi-slot scheduling is more than the L slots indicated by the DCI, in that case the slots are grouped in groups of L slots and channel estimation across the group boundary is not allowed. Thus, precoding resource groups (PRG) in time domain is introduced in analogy with frequency domain PRG, or more generally, a PRG is allowed also to extend across K>1 RBs and L>1 slots.

In general, whether the UE should assume that it can use cross slot channel estimation depends on dynamic signaling. In some embodiments, the time domain behavior is not encoded into the 1-bit indicator, but instead is encoded into the multi-slot grant or in the transmission configuration indicator (TCI) field also present in the DCI.

This procedure enables a gNB to flexibly switch between using the same precoder across the multiple slots, or changing the precoder across slots in the multi-slot scheduling or slot aggregation, depending on if the CSI is fresh or outdated (e.g., in case the gNB would like to cycle the co-phasing between the polarizations from slot to slot).

If a UE is scheduled across multiple slots it also knows (either via dynamically transmitted information received in the DCI or via semi-static configuration, e.g. received via RRC signaling) if the multi-slot scheduling is 1) a slot-aggregate (i.e. a TB is mapped to all scheduled slots) or 2)

multiple TB scheduling, i.e. one TB per slot. A separate K/L table could exist for the two kinds of multi-slot scheduling and depending on the kind one of the two configured tables is selected. The dynamic bundling indicator then selects the entry from the selected table.

The embodiments outlined above can also be applied to the uplink, in which case the uplink grant for a multi-slot scheduling or slot aggregation indicates whether the UE may use the same precoder across the slots (so gNB can utilize DMRS cross slots in channel estimation) (at least across L slots), or if this restriction does not hold and the UE is free to randomize the precoder in the uplink.

Particular embodiments are suitable for the case of transport block (TB) repetition in NR. In this case, a TB is repeated N times, possibly with different redundancy versions of the channel encoder. In this case it is beneficial for the transmitter to be able to switch the precoder for each repetition of the TB to achieve spatial diversity across repetitions. On the other hand, for low SNR, if channel estimation performance is limiting, it may be better to keep the same precoder so the UE can utilize more DMRS for channel estimation. Hence, being able to configure both L=1 or L>1 is useful in this case of TB repetition. The configuration may be dynamic or by higher layers in this case.

The embodiments described so far indicate whether the receiver can use the channel estimates across the slots or not. There is also a middle state, where the UE is not allowed to re-use channel estimates across slots, but the UE may still be allowed to re-use long term channel properties across slots, such as average delay, delay spread, Doppler spread and Doppler shift. These parameters are denoted quasi co-location (QCL) parameters in NR. If the DMRS across two slots are transmitted from the same gNB but with different precoders, these QCL parameters are still valid across the slot boundary even if the instantaneous channel estimates are not.

Thus, some embodiments are extended to also include QCL parameters. Some assumptions for a multi-slot scheduling or slot aggregation in a given point in time include: (a) receiver may assume DMRS channel estimates can be used across slots, (b) receiver may assume DMRS in one slot is QCL with DMRS in another slot but channel estimates cannot be reused across the slots, or (c) receiver may not assume that DMRS is QCL across slots and not that channel estimates cannot be used across slots.

The QCL assumption may be configured by higher layers when configuring the use of multi-slot scheduling or may be included in the states indicated by the 1 bit DCI, for example: State 1 where K=4, L=4, with no QCL across slots; and State 2 where K=4, L=4, with QCL across slots Pre-coding is sometimes denoted beam-forming and the analog version is denoted analog beam-forming. The signaling can thus be used to indicate if different slots are transmitted with the same or different beam-formers. Using different beam-formers is sometimes denoted a beam-sweep over the set of slots. In a beam-sweep the channel estimates cannot be used but the transmission is performed from the same transmission/reception point (TRP), enabling reuse of some channel parameters using a QCL configuration as described above.

Figure 3:
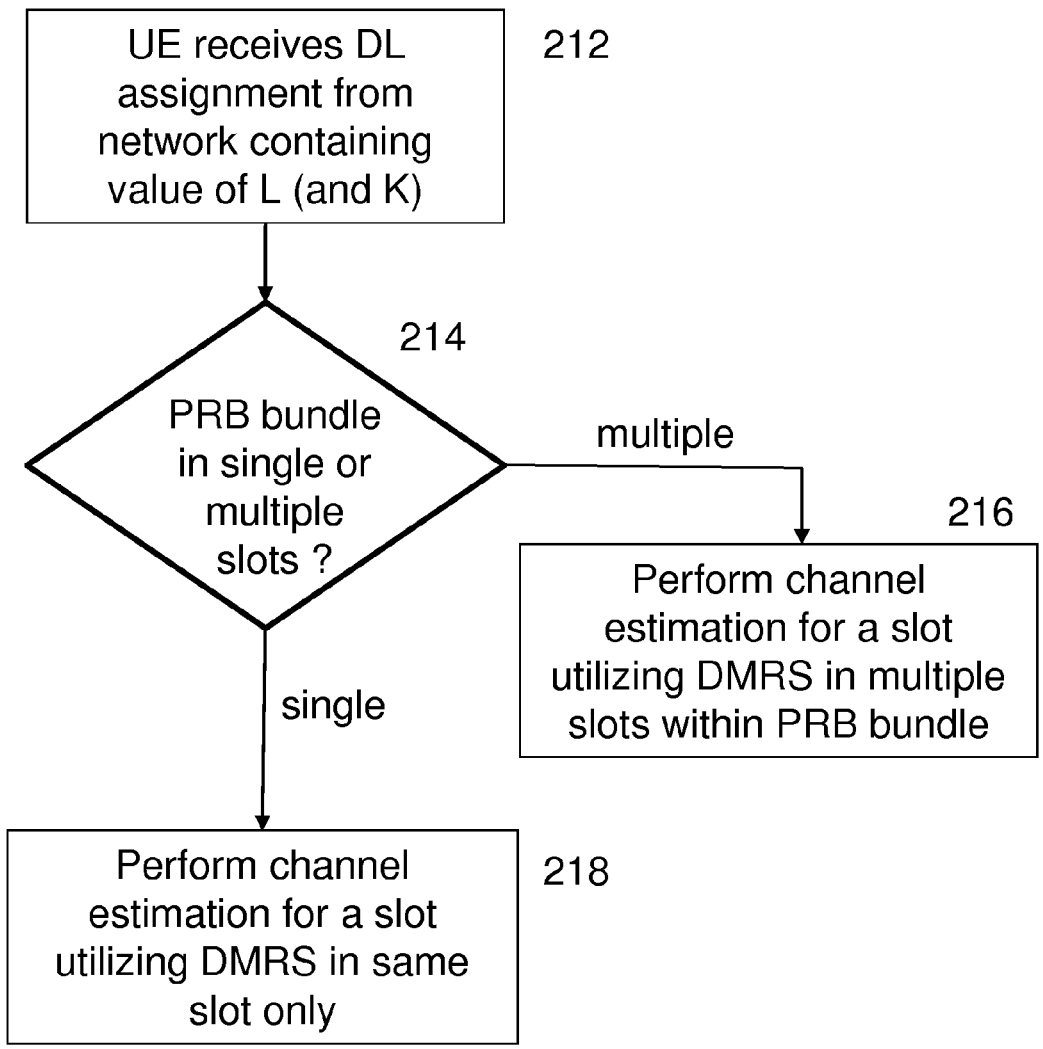
FIG. 3 is a flow diagram illustrating an example method in a wireless receiver, according to certain embodiments.

FIG. 3 illustrates a general example of certain embodiments described above. Specifically, FIG. 3 is a flow diagram illustrating an example method in a wireless receiver (e.g., wireless device 100 in downlink or network node 120 in uplink), according to certain embodiments.

At step 212, a UE receives a downlink assignment from a network node containing a value of L. The value of L represents a number of bundled slots. For example, wireless device 110 may receive a downlink assignment from network node 120. The downlink control information, or other information in the downlink assignment, may include a value of L. The value L may include any of the values described in the embodiments and examples above.

In particular embodiments, the downlink assignment may also include a value for K. The value of K represents a number of bundled resource blocks.

At step 214, the UE determines if a PRB bundle includes multiple slots. For example, wireless device 110 determines a number of slots based on L. If multiple slots, then the method continues to step 216, otherwise the method continues to step 218.

At step 216, the UE performs channel estimation for a slot using DMRS in multiple slots within the PRB bundle. For example, wireless device 110 may measure DMRS in L slots to estimate a channel from network node 120. At step 218, the UE performs channel estimation for a slot using DMRS in a single slot only.

Figure 4:
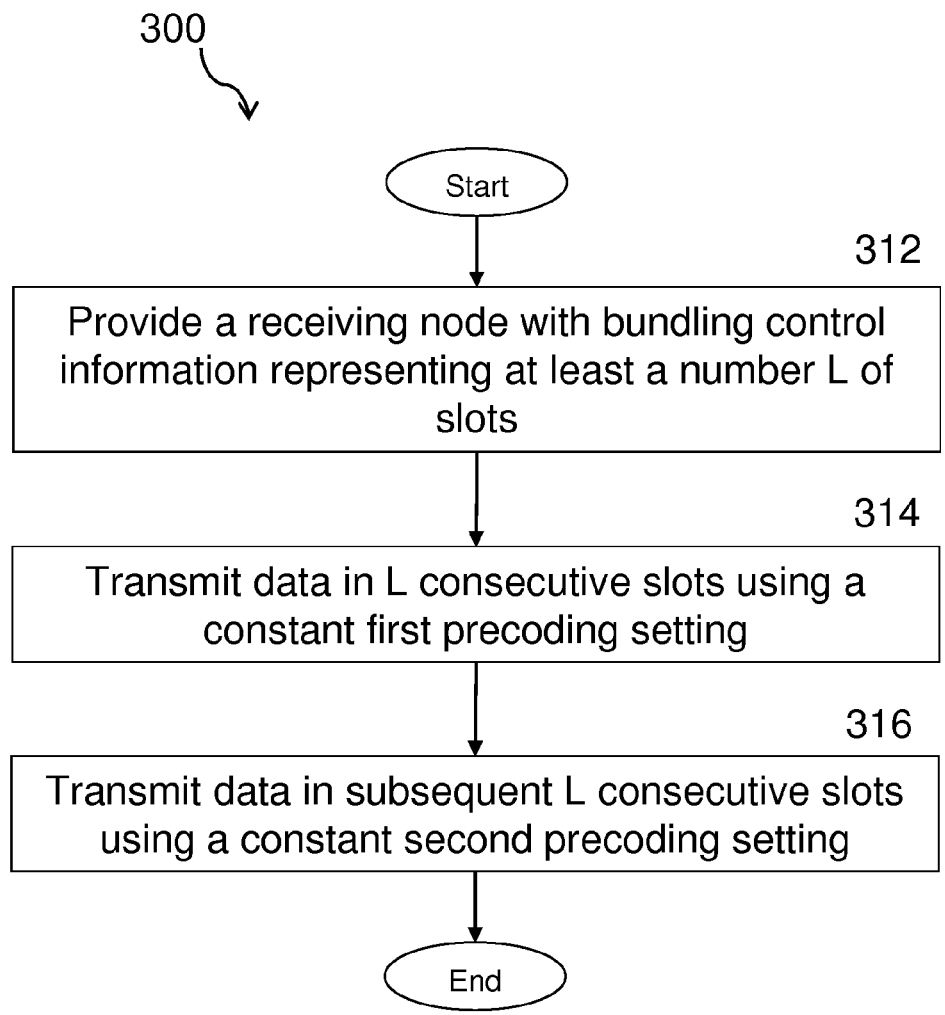
FIG. 4 is a flow diagram illustrating an example method in a wireless transmitter, according to certain embodiments.

FIG. 4 is a flow diagram illustrating an example method in a wireless transmitter, according to certain embodiments. In particular embodiments, one or more steps of FIG. 4 may be performed by network node 120 (e.g., downlink) or wireless device 110 (e.g., uplink) of network 100 described with respect to FIG. 2.

The method begins at step 312, where a wireless transmitter provides a receiving node with bundling control information representing at least a number L of slots. For example, network node 120 may send bundling control information to wireless device 110 using a downlink assignment, or any other suitable signaling. In particular embodiments, the bundle control information may also include a K number of resource blocks. In particular embodiments, the wireless transmitter may transmit the bundling control information according to any of the embodiments and examples described above.

At step 314, the wireless transmitter transmits data in L consecutive slots using a constant first precoding setting. For example, network node 120 may transmit L consecutive slots using the same first precoding setting. The precoding setting may be based on feedback from wireless device 110 regarding a channel quality. In particular embodiments, the wireless transmitter may transmit data according to any of the embodiments and examples described above.

At step 316, the wireless transmitter may transmit data in subsequent L consecutive slots using a constant second precoding setting. For example, after transmitting the first bundle to wireless device 110, network node 120 may receive updated channel information and select a second precoding setting. Network node 120 may transmit the subsequent L slots using the second precoding setting. In particular embodiments, the wireless transmitter may transmit data according to any of the embodiments and examples described above.

Modifications, additions, or omissions may be made to method 300 of FIG. 4. Additionally, one or more steps in the method of FIG. 4 may be performed in parallel or in any suitable order. The steps may be repeated over time as necessary.

Figure 5:
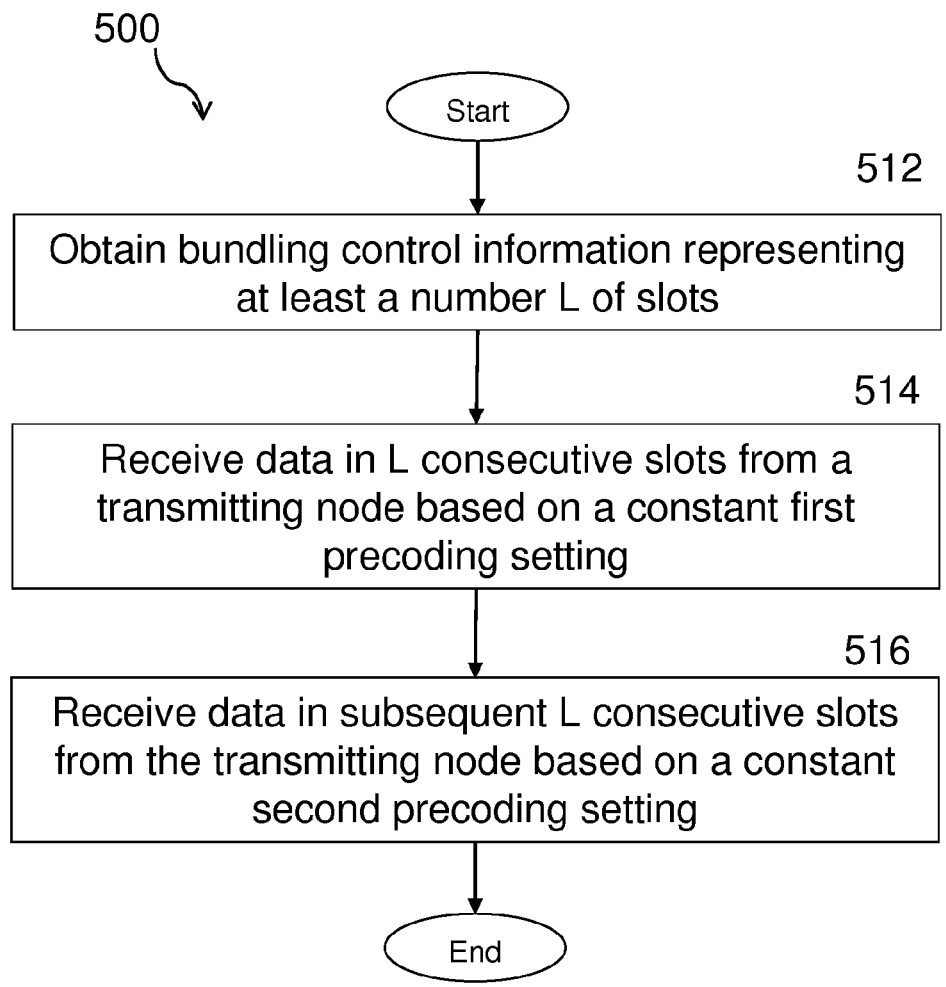
FIG. 5 is a flow diagram illustrating another example method in a wireless receiver, according to certain embodiments.

FIG. 5 is a flow diagram illustrating another example method in a wireless receiver, according to certain embodiments. In particular embodiments, one or more steps of FIG. 5 may be performed by wireless device 110 (e.g., downlink) or network node 120 (e.g., uplink) of network 100 described with respect to FIG. 2.

The method begins at step 512, where a wireless receiver obtains bundling control information representing at least a number L of slots. For example, wireless device 110 may receive bundling control information from network node 120 using a downlink assignment, or any other suitable signaling. In particular embodiments, the bundle control information may also include a K number of resource blocks. In particular embodiments, the wireless receiver may receive the bundling control information according to any of the embodiments and examples described above.

At step 514, the wireless receiver receives data in L consecutive slots from a transmitting node based on a constant first precoding setting. For example, wireless device 110 may receive L consecutive slots encoded with the same precoding setting. The precoding setting may be based on feedback from wireless device 110 regarding a channel quality. In particular embodiments, the wireless receiver may receive data according to any of the embodiments and examples described above.

At step 516, the wireless receiver receives data in subsequent L consecutive slots from the transmitting node based on a constant second precoding setting. For example, after receiving the first bundle from network node 120, wireless device 110 may send network node 120 updated channel information and network node may select a second precoding setting. Wireless device 110 may receive the subsequent L slots encoded according to the second precoding setting. In particular embodiments, the wireless receiver may receive data according to any of the embodiments and examples described above.

Modifications, additions, or omissions may be made to method 500 of FIG. 5. Additionally, one or more steps in the method of FIG. 5 may be performed in parallel or in any suitable order. The steps may be repeated over time as necessary.

Figure 6A:
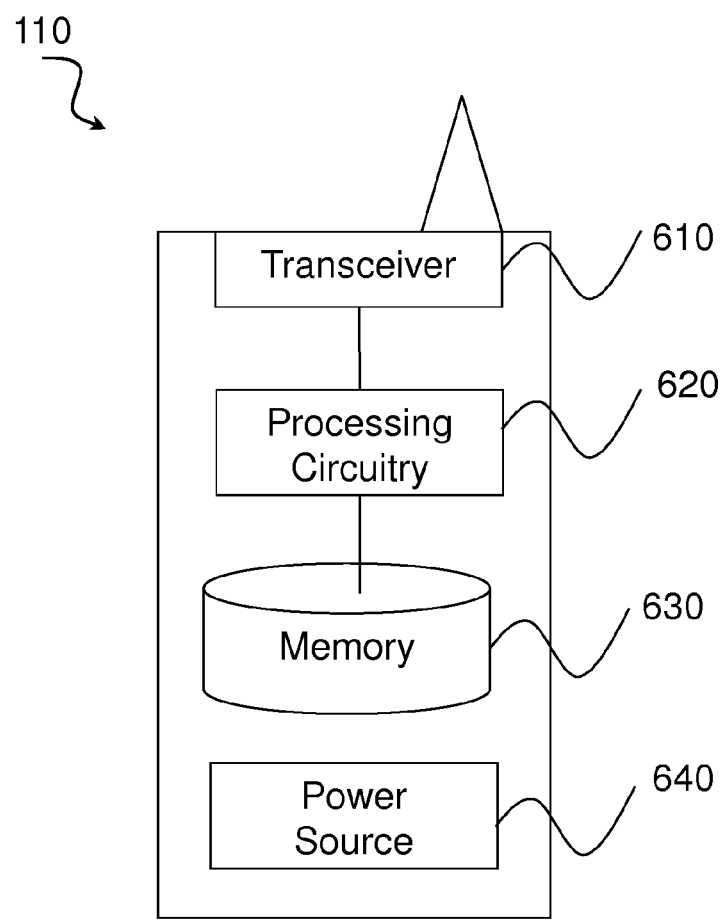
FIG. 6A is a block diagram illustrating an example embodiment of a wireless device, according to certain embodiments.

FIG. 6A is a block diagram illustrating an example wireless device, according to certain embodiments. The wireless device is an example of the wireless devices 110 illustrated in FIG. 2. In particular embodiments, the wireless device is capable of transmitting and receiving bundling control information, determining whether a bundle of slots are encoded according the same precoding setting, and measuring reference signals and encoding/decoding transport blocks according to the bundling control information.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 610, processing circuitry 620, memory 630, and power source 640. In some embodiments, transceiver 610 facilitates transmitting wireless signals to and receiving wireless signals from wireless network node 120 (e.g., via an antenna), processing circuitry 620 executes instructions to provide some or all of the functionality described herein as provided by the wireless device, and memory 630 stores the instructions executed by processing circuitry 620. Power source 640 supplies electrical power to one or more of the components of wireless device 110, such as transceiver 610, processing circuitry 620, and/or memory 630.

Processing circuitry 620 includes any suitable combination of hardware and software implemented in one or more integrated circuits or modules to execute instructions and manipulate data to perform some or all of the described functions of the wireless device. In some embodiments, processing circuitry 620 may include, for example, one or more computers, one more programmable logic devices, one or more central processing units (CPUs), one or more microprocessors, one or more applications, and/or other logic, and/or any suitable combination of the preceding. Processing circuitry 620 may include analog and/or digital circuitry configured to perform some or all of the described functions of wireless device 110. For example, processing circuitry 620 may include resistors, capacitors, inductors, transistors, diodes, and/or any other suitable circuit components.

Memory 630 is generally operable to store computer executable code and data. Examples of memory 630 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 640 is generally operable to supply electrical power to the components of wireless device 110. Power source 640 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 6A) responsible for providing certain aspects of the wireless device's functionality, including any of the functionality described above and/or any additional functionality (including any functionality necessary to support the solution described above).

Figure 6B:
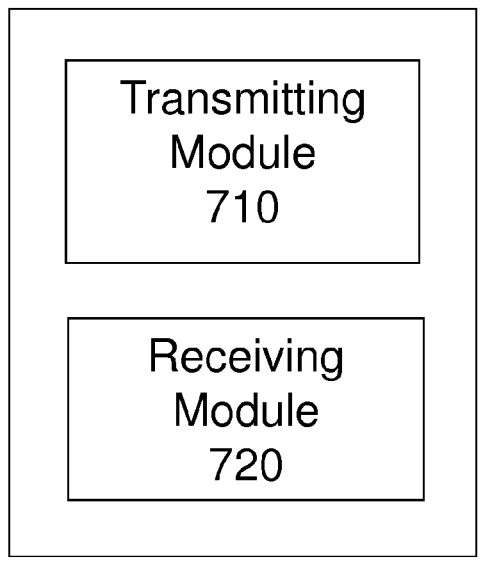
FIG. 6B is a block diagram illustrating example components of a wireless device, according to certain embodiments.

FIG. 6B is a block diagram illustrating example components of a wireless device 110, according to certain embodiments. The components may include transmitting module 710 and receiving module 720.

Transmitting module 710 may perform the transmitting functions of wireless device 110. For example, transmitting module 710 may transmit bundling control information according to any of the examples and embodiments described above. In certain embodiments, transmitting module 710 may include or be included in processing circuitry 620. In particular embodiments, transmitting module 710 may communicate with receiving module 720.

Receiving module 720 may perform the receiving functions of wireless device 110. For example, receiving module 720 may receive bundling control information according to any of the examples and embodiments described above. In certain embodiments, receiving module 720 may include or be included in processing circuitry 620. In particular embodiments, receiving module 720 may communicate with transmitting module 710.

Figure 7B:
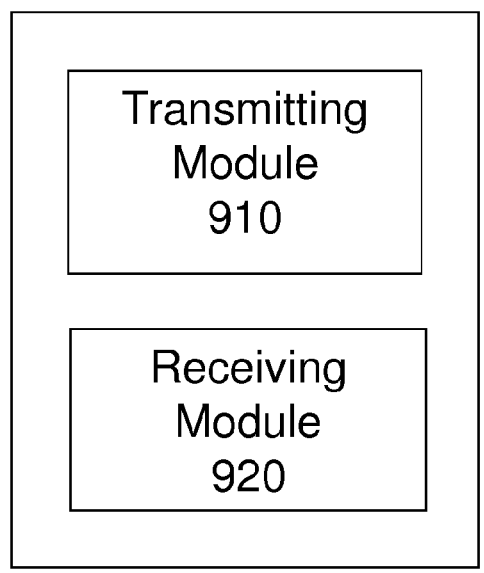
FIG. 7B is a block diagram illustrating example components of a network node, according to certain embodiments.
Figure 7A:
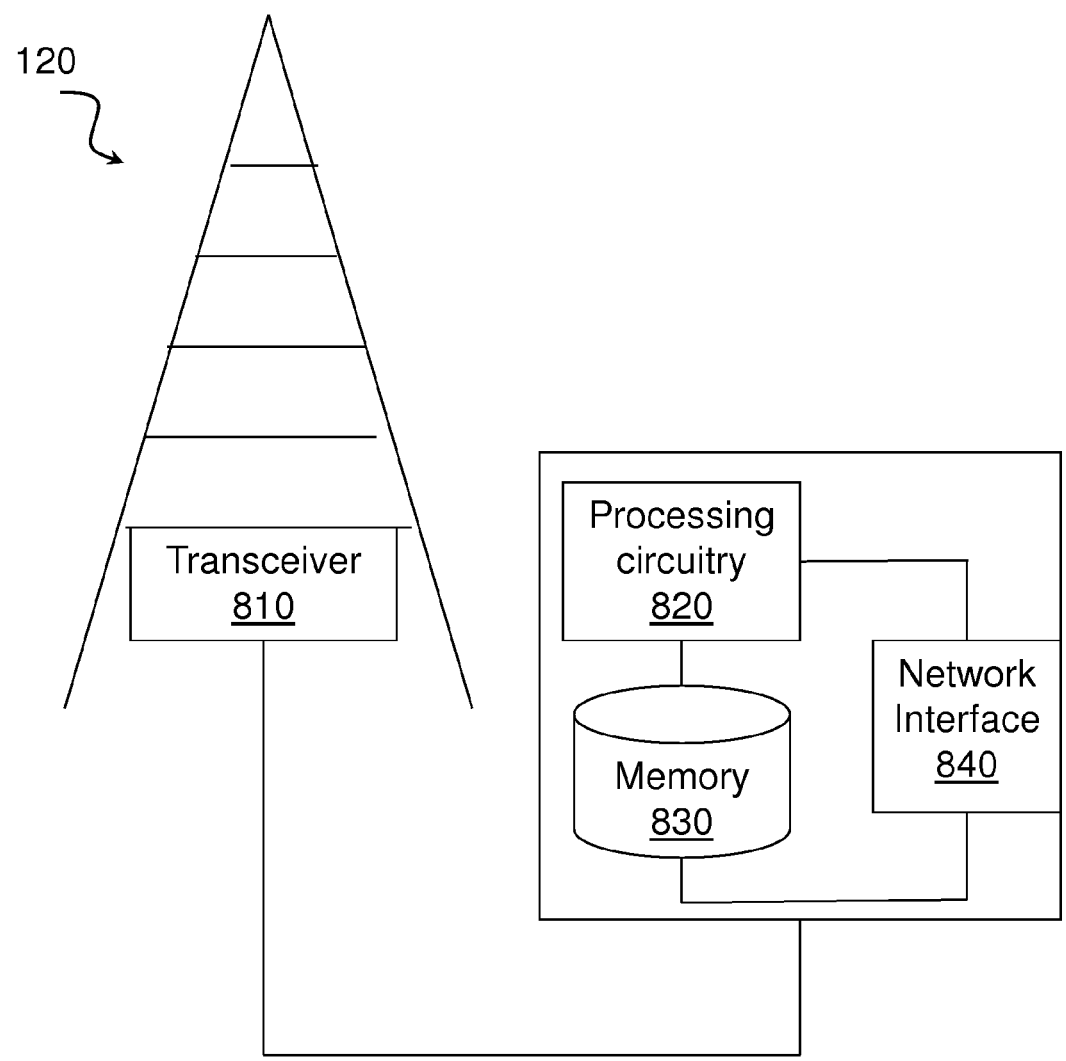
FIG. 7A is a block diagram illustrating an example embodiment of a network node, according to certain embodiments.

FIG. 7A is a block diagram illustrating an example network node, according to certain embodiments. The network node is an example of the network node 120 illustrated in FIG. 2. In particular embodiments, the network node is capable of transmitting and receiving bundling control information, determining whether a bundle of slots are encoded according the same precoding setting, and measuring reference signals and encoding/decoding transport blocks according to the bundling control information.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 810, at least one processing circuitry 820, at least one memory 830, and at least one network interface 840. Transceiver 810 facilitates transmitting wireless signals to and receiving wireless signals from a wireless device, such as wireless devices 110 (e.g., via an antenna); processing circuitry 820 executes instructions to provide some or all of the functionality described above as being provided by a network node 120; memory 830 stores the instructions executed by processing circuitry 820; and network interface 840 communicates signals to backend network components, such as a gateway, switch, router, Internet, Public Switched Telephone Network (PSTN), controller, and/or other network nodes 120. Processing circuitry 820 and memory 830 can be of the same types as described with respect to processing circuitry 620 and memory 630 of FIG. 6A above.

In some embodiments, network interface 840 is communicatively coupled to processing circuitry 820 and refers to any suitable device operable to receive input for network node 120, send output from network node 120, perform suitable processing of the input or output or both, communicate to other devices, or any combination of the preceding. Network interface 840 includes appropriate hardware (e.g., port, modem, network interface card, etc.) and software, including protocol conversion and data processing capabilities, to communicate through a network.

FIG. 7B is a block diagram illustrating example components of a network node 120, according to certain embodiments. The components may include transmitting module 910 and receiving module 920.

Transmitting module 910 may perform the transmitting functions of network node 120. For example, transmitting module 910 may transmit bundling control information according to any of the examples and embodiments described above. In certain embodiments, transmitting module 920 may include or be included in processing circuitry 820. In particular embodiments, transmitting module 910 may communicate with receiving module 920.

Receiving module 920 may perform the receiving functions of network node 120. For example, receiving module 920 may receive and/or transmit bundling control information according to any of the examples and embodiments described above. In certain embodiments, receiving module 920 may include or be included in processing circuitry 820. In particular embodiments, receiving module 920 may communicate with transmitting module 910.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Figure 8:
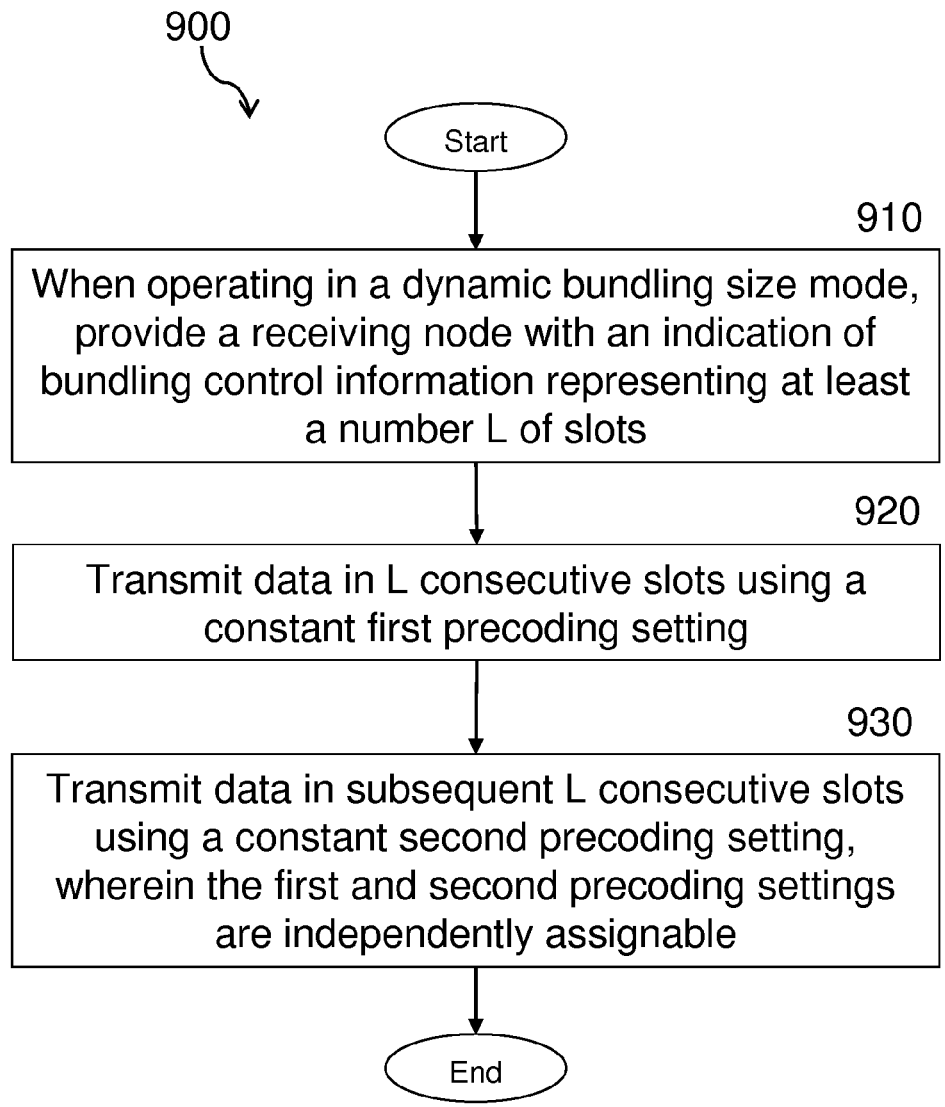
FIG. 8 is a flow diagram illustrating an example method by a transmitting node for transmitting data to a receiving node, according to certain embodiments.

FIG. 8 is a flow diagram illustrating an example method 900 by a transmitting node for transmitting data to a receiving node, according to certain embodiments. In a particular embodiment, the transmitting node is a network node 120 and the receiving node is a user equipment 110.

At step 910, when operating in the dynamic bundling size mode, the transmitting node provides the receiving node with an indication of bundling control information representing at least a number L of slots.

In a particular embodiment, the indication of bundling control information consists of a single bit wherein a first value of the single bit represents a first combination of K and L, and a second value of the single bit represents a second combination of K and L.

At step 920, the transmitting node transmits data in L consecutive slots using a constant first precoding setting. The transmitting node also transmits data in subsequent L consecutive slots using a constant second precoding setting, at step 930. The first and second precoding settings are independently assignable.

In a particular embodiment, the step of transmitting the data in the L consecutive slots using the constant first precoding setting at step 920 may include transmitting the data in a number K of resource blocks, and the step of transmitting the data in the subsequent L consecutive slots using the constant second precoding setting at step 930 may include transmitting the data in the number K of resource blocks.

In a particular embodiment, the method may further include determining that channel state information is not outdated prior to transmitting the bundling control information and transmitting the bundling control information in response to determining that the channel state information is not outdated.

In a particular embodiment, the method may further include the transmitting node operating in a static bundling size mode. When operating in the static bundling mode, the transmitting mode may transmit data in a predetermined number $L_0$ of consecutive slots using a constant third precoding setting and transmit data in the predetermined number $L_0$ of subsequent consecutive slots using a constant fourth precoding setting. The third and fourth precoding settings are independently assignable.

In a particular embodiment, the method may further include determining that channel state information is outdated and, in response to determining that the channel state information is outdated, transmitting updated bundling control information to the receiving node to transition the receiving node to the static bundling size mode.

Figure 9:
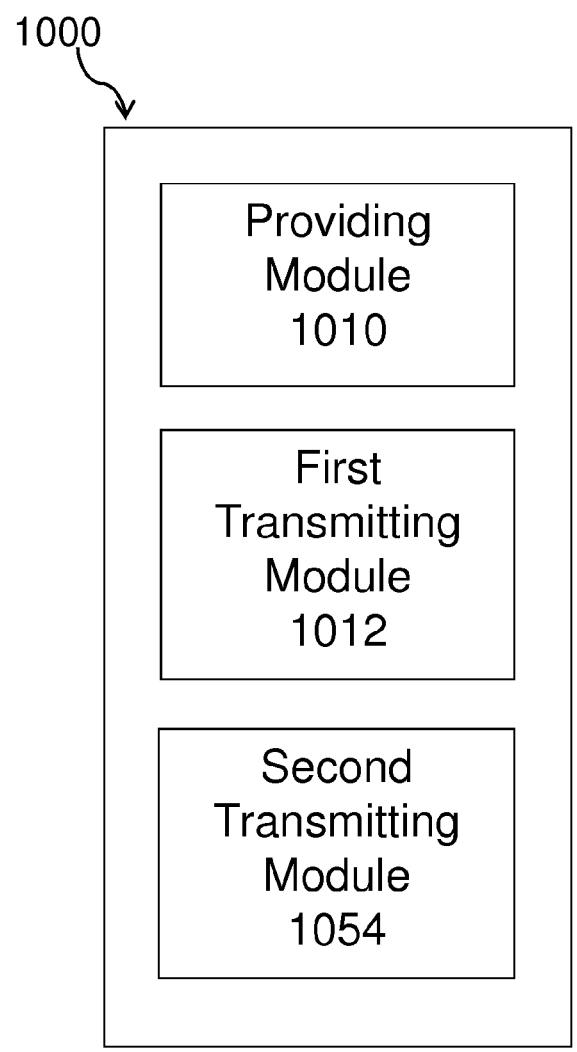
FIG. 9 is a block diagram illustrating an example virtual apparatus in a wireless network, according to certain embodiments.

FIG. 9 is a block diagram illustrating an example virtual apparatus 1000 in a wireless network (for example, the wireless network shown in FIG. 2). The apparatus may be implemented in a wireless device or network node (e.g., wireless device 110 or network node 120 shown in FIG. 2). Apparatus 1000 is operable to carry out the example method described with reference to FIG. 8 and possibly any other processes or methods disclosed herein. It is also to be understood that the method of FIG. 8 is not necessarily carried out solely by apparatus 1000. At least some operations of the method can be performed by one or more other entities.

Virtual Apparatus 1000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause providing module 1010, first transmitting module 1020, second transmitting module 1030, and any other suitable units of apparatus 1000 to perform corresponding functions according one or more embodiments of the present disclosure.

According to certain embodiments, providing module 1010 may perform certain of the providing functions of the apparatus 1000. For example, when operating in the dynamic bundling size mode, providing module 1010 may provide the receiving node with an indication of bundling control information representing at least a number L of slots.

According to certain embodiments, first transmitting module 1020 may perform certain of the transmitting functions of the apparatus 1000. For example, first transmitting module 1020 may transmit data in L consecutive slots using a constant first precoding setting.

According to certain embodiments, second transmitting module 1030 may perform certain other of the transmitting functions of the apparatus 1000. For example, second transmitting module 1030 may transmit data in subsequent L consecutive slots using a constant second precoding setting. The first and second precoding settings are independently assignable.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 10:
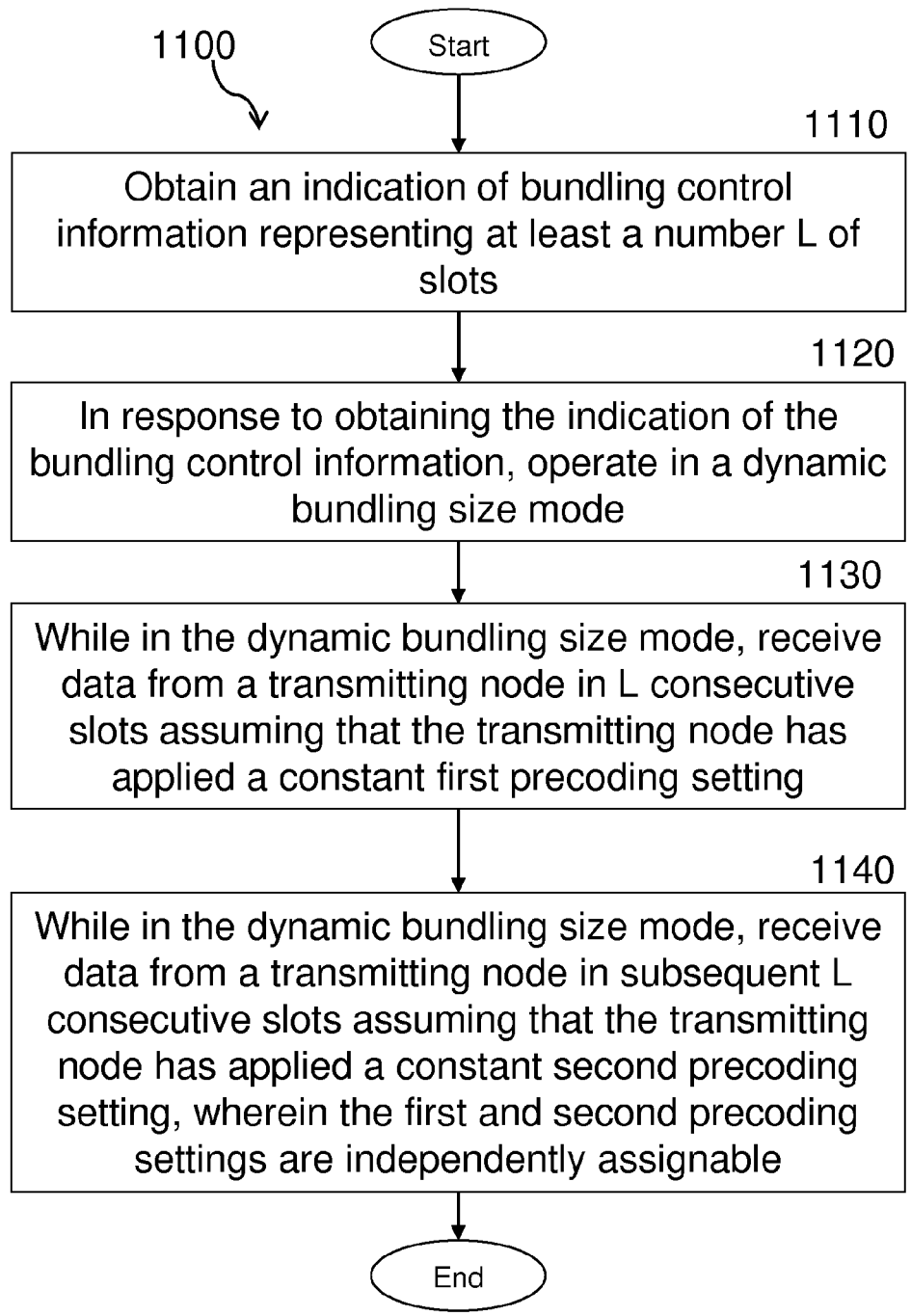
FIG. 10 is a flow diagram illustrating another example method in a wireless receiver, according to certain embodiments.

FIG. 10 is a flow diagram illustrating an example method 1100 by a receiving node for receiving data from a transmitting node, according to certain embodiments. In a particular embodiment, the receiving node is a user equipment and the transmitting node is a network node.

At step 1110, the receiving node obtains an indication of bundling control information representing at least a number L of slots.

At step 1120, in response to obtaining the indication of the bundling control information, the receiving node operates in a dynamic bundling size mode. In a particular embodiment, the receiving node may transition into a dynamic bundling size mode from a static bundling size mode. In another embodiment, the receiving node may be in the dynamic bundling size mode when the indication is obtained and determine to stay in the dynamic bundling size mode based on the indication.

At step 1130, while in the dynamic bundling size mode, the receiving node receives data from the transmitting node in L consecutive slots assuming that the transmitting node has applied a constant first precoding setting. The receiving node also receives data from the transmitting node in subsequent L consecutive slots assuming that the transmitting node has applied a constant second precoding setting, at step 1140. The first and second precoding settings are independently assignable.

For example, in certain particular embodiments, the receiver may determine based on the indication of bundling control information that the precoding setting is unchanged. As such, channel estimation can be interpolated over the whole allocation, using all available DMRS. Additionally, in certain particular embodiments, the receiver may determine that any changes in the channel estimate on the DMRS is a result of changes in the radio channel and not due to any changes in precoding. In a particular embodiment, the method may further include receiving the data by processing a received signal in accordance with the precoding assumption.

In a particular embodiment, the method may further include performing channel estimation on the L consecutive slots to form a first joint channel estimate for the L consecutive slots and performing channel estimation on the subsequent L consecutive slots to form a second joint channel estimate for the subsequent L consecutive slots.

In a particular embodiment, the bundling control information further represents a number K of resource blocks, and the method further includes receiving data in K resource blocks and the L consecutive slots using the constant first precoding setting and receiving data in K resource blocks and the subsequent L consecutive slots using the constant second precoding setting.

In a particular embodiment, the bundling control information consists of a single bit wherein a first value of the single bit represents a first combination of K and L, and a second value of the single bit represents a second combination of K and L.

In a particular embodiment, the method may further include the receiving node measuring a DMRS in the L consecutive slots and estimating one or more channels from the transmitting node. In another embodiment, the method may include the receiving node measuring a DMRS in the L consecutive slots and K resource blocks to estimate one or more channels from the transmitting node.

In a particular embodiment, when operating in the static bundling size mode, the receiving node may receive data in a predetermined number $L_0$ of consecutive slots using a constant third precoding setting and receive data in a predetermined number $L_0$ of subsequent consecutive slots using a constant fourth precoding setting. The third and fourth precoding settings are independently assignable.

Figure 11:
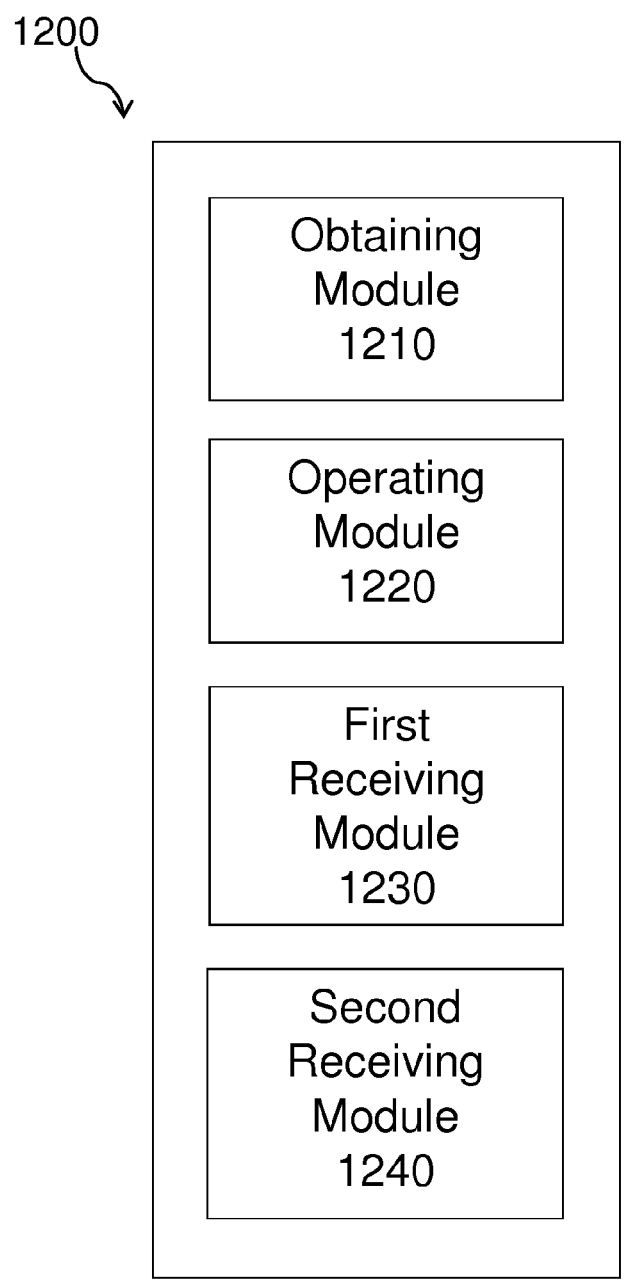
FIG. 11 is a block diagram illustrating another example virtual apparatus in a wireless network, according to certain embodiments.

FIG. 11 is a block diagram illustrating another example virtual apparatus 1200 in a wireless network (for example, the wireless network shown in FIG. 2). The apparatus may be implemented in a wireless device or network node (e.g., wireless device 110 or network node 120 shown in FIG. 2). Apparatus 1200 is operable to carry out the example method described with reference to FIG. 10 and possibly any other processes or methods disclosed herein. It is also to be understood that the method of FIG. 10 is not necessarily carried out solely by apparatus 1200. At least some operations of the method can be performed by one or more other entities.

Virtual Apparatus 1200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1210, operating module 1220, first receiving module 1230, second receiving module 1240, and any other suitable units of apparatus 1200 to perform corresponding functions according one or more embodiments of the present disclosure.

According to certain embodiments, obtaining module 1210 may perform certain of the obtaining functions of the apparatus 1200. For example, obtaining module 1210 may obtain an indication of bundling control information representing at least a number L of slots.

According to certain embodiments, operating module 1220 may perform certain of the operating functions of the apparatus 1200. For example, operating module 1220 may operate in a dynamic bundling size mode in response to obtaining the indication of the bundling control information.

According to certain embodiments, first receiving module 1230 may perform certain of the receiving functions of the apparatus 1200. For example, first receiving module 1230 may receive data from the transmitting node in L consecutive slots assuming that the transmitting node has applied a constant first precoding setting.

According to certain embodiments, second receiving module 1240 may perform certain other of the receiving functions of the apparatus 1200. For example, second receiving module 1240 may receive data from the transmitting node in subsequent L consecutive slots assuming that the transmitting node has applied a constant second precoding setting. The first and second precoding settings are independently assignable.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The following list provides non-limiting examples of how certain aspects of the proposed solutions could be implemented. The examples are merely intended to illustrate how certain aspects of the proposed solutions could be implemented, however, the proposed solutions could also be implemented in other suitable manners. Examples include:

According to certain example embodiments, a transmitting node for transmitting data to a receiving node is provided. The transmitting node is operable at least in a dynamic bundling size mode and comprises a communication interface and processing circuitry configured to:

when operating in the dynamic bundling size mode:
provide the receiving node with bundling control information representing at least a number L of slots;
transmit data in L consecutive slots using a constant first precoding setting; and
transmit data in subsequent L consecutive slots using a constant second precoding setting,
wherein the first and second precoding settings are independently assignable optionally, the bundling control information further represents a number K of resource blocks and the processing circuit is configured to transmit data in K resource blocks and L consecutive slots using the constant first precoding setting and transmit data in K resource blocks and subsequent L consecutive slots using the constant second precoding setting, optionally, the bundling control information consists of a single bit wherein a first value of the single bit represents a first combination of K and L, and a second value of the single bit represents a second combination of K and L, optionally, in a static bundling size mode, the processing circuitry is further configured to:
when operating in the static bundling size mode:
transmit data in a predetermined number $L_0$ of consecutive slots using a constant first precoding setting; and
transmit data in a predetermined number $L_0$ of subsequent consecutive slots using a constant second precoding setting,
wherein the first and second precoding settings are independently assignable.

According to certain example embodiments, a receiving node for receiving data from a transmitting node is provided. The receiving node is operable at least in a dynamic bundling size mode and comprises a communication interface and processing circuitry configured to:

when operating in the dynamic bundling size mode:
obtain bundling control information representing at least a number L of slots;
receive data from the transmitting node in L consecutive slots assuming that the transmitting node has applied a constant first precoding setting;
receiving data from the transmitting node in subsequent L consecutive slots assuming that the transmitting node has applied a constant second precoding setting,
wherein the first and second precoding settings are independently assignable, optionally, the bundling control information further represents a number K of resource blocks;

optionally, the processing circuit is configured to receive data in K resource blocks and L consecutive slots using the constant first precoding setting and receive data in K resource blocks and subsequent L consecutive slots using the constant second precoding setting.

optionally, the bundling control information consists of a single bit wherein a first value of the single bit represents a first combination of K and L, and a second value of the single bit represents a second combination of K and L;

optionally, the processing circuitry further configured to measure a DMRS in L slots to estimate a channel from the transmitting node;

optionally, in a static bundling size mode, the processing circuitry is further configured to:
when operating in the static bundling size mode:
receive data in a predetermined number $L_0$ of consecutive slots using a constant first precoding setting; and
receive data in a predetermined number $L_0$ of subsequent consecutive slots using a constant second precoding setting,
wherein the first and second precoding settings are independently assignable.

Optionally, the processing circuitry is configured to receive the data by processing a received signal in accordance with a precoding assumption.

ADDITIONAL INFORMATION

A non-limiting example of how certain aspects of the proposed solutions could be implemented within the framework of a specific communication standard is provided. In particular, a non-limiting example of how the proposed solutions could be implemented within the framework of a 3GPP TSG RAN standard is described below. The changes described herein are merely intended to illustrate how certain aspects of the proposed solutions could be implemented in a particular standard. However, the proposed solutions could also be implemented in other suitable manners, both in the 3GPP Specification and in other specifications or standards.

Some characteristics of physical resource block (PRB) bundling for downlink include:
1. PRB bundling may support a bundle size of 1 resource block (RB)
2. A default PRG configuration may be used prior to a user equipment (UE) receiving radio resource control (RRC) configuration Below describes PRB bundling for Rel.15 downlink NR. Note that the time domain may be taken into account in the PRB bundling definition because NR will support multi-slot scheduling, including transport block (TB) repetition bundling size may include (including possible down-selection):
Case 1: value(s) based on RBG
  RBG/k, where k is integer
  m×RBG, where m is integer, In some cases, m may always be equal to 1
Case 2: other values based on bandwidth part, and/or scheduled bandwidth and/or UE capability etc.
  Consecutive scheduled bandwidth
  Values equal or larger than scheduled bandwidth (BW)

The use case for 1 RB (12 subcarriers) bundling size would be either RA type 0 with RBG size equal to 1, or RA type 1 to allow for very fast changing precoder cycling per RB. An alternative would be to use Case 2 where the precoder cycling change from RB to RB or from subcarrier to subcarrier has to be very slow. Hence Case 2 is better tailored for larger scheduling BWs. So the remaining use case for 1 RB PRG size is then the small resource allocations.

PRG size of 1 RB increases the possibilities and flexibility for MU-MIMO pairing. Also, reciprocity may be used where a single RB granularity can be useful to follow the channel variations but where time domain channel estimation is less useful due to non-comb based structure (DMRS config type 2).

Thus, 1 RB may be added to the set {2,4,full} of possible PRB bundling sizes in frequency domain where "full" means Case 2.

According to certain embodiments, PRB bundle size of 1 RB in frequency domain is supported. For example, PRB bundling for multi-slot scheduling may be supported. In case multi-slot scheduling is used, it is beneficial if the PRB bundling extends across slots so that the UE can utilize the channel estimates from previous slots to enhance the estimates in the current slot. On the other hand, there are cases where the gNB would like to change the precoder from slot to slot to maximize the spatial diversity gain, if the channel state indicator (CSI) is not accurate, e.g. polarization co-phasing information is outdated. One such use case is when repetition of a transport block is used across multiple slots. Whether such precoder cycling over time is used depends on the CSI availability at the gNB and thus need to change dynamically.

Therefore, the concept of a "bundle" may also cover the time domain. A PRB bundle thus extends {1,2,4,all} RB in frequency and one or more slots in time domain. According to certain embodiments, the frequency domain definition of a PRB bundle may be extended to time dimension by also specifying whether a PRG to be valid over one slot or multiple consecutive slots.

For example, 1 bit in DCI and associated RRC signalling may be used. The following PRB bundle sizes are supported {1,2,4,full}, where full means "values equal to consecutively scheduled bandwidth in frequency". The gNB needs to be able to switch between PRG bundle sizes depending on the availability of CSI. If uplink is overloaded, then CSI report or sounding reference signal (SRS) cannot be scheduled and gNB need to resort to open loop type of transmission, e.g. small bundle size and transparent precoder cycling. Also, depending on whether SU or MU is scheduled, the PRG bundling size can be larger. Since support of dynamic switching is a UE capability, RRC signaling may be used to configure this feature.

According to certain embodiments, whether dynamic PRB bundling indication is used or not may be configured by UE specific RRC signaling.

Note that whether the DCI always contain this 1 bit field or not can be discussed in the agenda discussing DCI formats since there will be many possible fields in DCI and there proposals to solve this using a DCI header. 1 bit in DCI dynamically switches between two RRC configured PRB bundling states where each state has a frequency and time bundling definition. The bundling values in frequency domain are selected from the list {1,2,4,full} RBs while the bundling values in time is {1,x} where x may depend on the outcome of the multi-slot scheduling agenda item.

According to certain embodiments, when dynamic PRB bundling indication is enabled, the 1 bit field in DCI is used to dynamically switch between two RRC configured PRB bundling states. Values can be selected from {1,2,4,all} RBs and {1,x} slots.

According to certain embodiments, default PRB bundle size may be determined prior to RRC configuration. Prior to RRC signaling, it is unknown whether UE supports dynamic switching of PRB bundling, thus a single PRB bundling state may be used. Messages prior to RRC are for example RMSI, which is roughly 250 bits and thus will use around 12 RB or more. The PDSCH containing initial RRC is likely much larger than 250 bits. Hence, there is no need to use 1 RB in this case. Still specification transparent transmit diversity should be possible and thus 2 RB may be used for default bundling size in frequency and 1 slot in time.

According to certain embodiments, the default (prior to RRC configuration) downlink PRB bundling configuration is 2 RB in frequency and 1 slot in time.

ABBREVIATIONS

Abbreviations used in the preceding description include:
3GPP Third Generation Partnership Project
BBU Baseband Unit
BTS Base Transceiver Station
BW Bandwidth
CC Component Carrier
CQI Channel Quality Information
CSI Channel State Information
D2D Device to Device
DFT Discrete Fourier Transform
DL Downlink
DMRS Demodulation Reference Signal eNB eNodeB
FDD Frequency Division Duplex
FFT Fast Fourier Transform
gNB Next-generation NodeB
LAA Licensed-Assisted Access
LBT Listen-before-talk
LTE Long Term Evolution
LTE-U LTE in Unlicensed Spectrum
M2M Machine to Machine
MCS Modulation and Coding Scheme
MIB Master Information Block
MIMO Multi-Input Multi-Output
MTC Machine Type Communication
MU Multi-User
NR 3GPP New Radio
OFDM Orthogonal Frequency Division Multiplexing
PRB Physical Resource Block
PRG Precoding RB Group
RA Random Access
RAN Radio Access Network
RAT Radio Access Technology
RB Resource Block
RBG Resource Block Group
RBS Radio Base Station
RNC Radio Network Controller
RRC Radio Resource Control
RRH Remote Radio Head
RRU Remote Radio Unit
SCell Secondary Cell
SI System Information
SIB System Information Block
SU Single-User
TB Transport Block
TBS Transport Block Size
TDD Time Division Duplex
TTI Transmission Time Interval
UE User Equipment
UL Uplink
URLLC Ultra Reliable Low Latency Communication
UTRAN Universal Terrestrial Radio Access Network
WAN Wireless Access Network

The invention claimed is:

1. A transmitting node for transmitting data to a receiving node, wherein the transmitting node is operable at least in a dynamic bundling size mode and comprises:
a communication interface; and
processing circuitry configured to:
when operating in the dynamic bundling size mode:
provide the receiving node with an indication of bundling control information representing at least a number L of slots;
transmit data in L consecutive slots using a constant first precoding setting; and
transmit data in subsequent L consecutive slots using a constant second precoding setting,
wherein the first and second precoding settings are independently assignable.

2. The transmitting node of claim 1, wherein the data transmitted in the L consecutive slots using the constant first precoding setting is transmitted in the number K of resource blocks; and
the data transmitted in the subsequent L consecutive slots using the constant second precoding setting is transmitted in the number K of resource blocks.

3. The transmitting node of claim 2, wherein the indication of bundling control information consists of a single bit wherein a first value of the single bit represents a first combination of K and L, and a second value of the single bit represents a second combination of K and L.

4. The transmitting node of claim 1, wherein the processing circuitry is configured to:
determine that channel state information is not outdated prior to transmitting the bundling control information, and
transmit the bundling control information in response to determining that the channel state information is not outdated.

5. The transmitting node of claim 1, wherein the processing circuitry is further configured to:
when operating in a static bundling size mode:
transmit data in a predetermined number L0 of consecutive slots using a constant third precoding setting; and
transmit data in the predetermined number L0 of subsequent consecutive slots using a constant fourth precoding setting,
wherein the third and fourth precoding settings are independently assignable.

6. The transmitting node of claim 5, wherein the processing circuitry is configured to:
determine that channel state information is outdated, and
in response to determining that the channel state information is outdated, transmit updated bundling control information to the receiving node to transition the receiving node to the static bundling size mode.

7. The transmitting node of claim 1, wherein the transmitting node is a network node and the receiving node is a user equipment.

8. A receiving node for receiving data from a transmitting node, wherein the receiving node is operable at least in a dynamic bundling size mode and comprises:
a communication interface; and
processing circuitry configured to:
obtain an indication of bundling control information representing at least a number L of slots;
in response to obtaining the indication of the bundling control information, operate in a dynamic bundling size mode;
while in the dynamic bundling size mode, receive data from the transmitting node in L consecutive slots assuming that the transmitting node has applied a constant first precoding setting;
while in the dynamic bundling size mode, receive data from the transmitting node in subsequent L consecutive slots assuming that the transmitting node has applied a constant second precoding setting,
wherein the first and second precoding settings are independently assignable.

9. The receiving node of claim 8, wherein the processing circuitry is configured to:
perform channel estimation on the L consecutive slots to form a first joint channel estimate for the L consecutive slots; and
perform channel estimation on the subsequent L consecutive slots to form a second joint channel estimate for the subsequent L consecutive slots.

10. The receiving node of claim 8, wherein:
the bundling control information further represents a number K of resource blocks;
the processing circuit is configured to:
receive data in K resource blocks and the L consecutive slots using the constant first precoding setting; and receive data in K resource blocks and the subsequent L consecutive slots using the constant second precoding setting.

11. The receiving node of claim 10, wherein the bundling control information consists of a single bit wherein a first value of the single bit represents a first combination of K and L, and a second value of the single bit represents a second combination of K and L.

12. The receiving node of claim 10, the processing circuitry further configured to measure a DMRS in the L consecutive slots and K resource blocks to estimate one or more channels from the transmitting node.

13. The receiving node of claim 8, the processing circuitry further configured to measure a DMRS in the L consecutive slots and to estimate one or more channels from the transmitting node.

14. The receiving node of claim 8, wherein the processing circuitry is further configured to:
when operating in the static bundling size mode:
receive data in a predetermined number L0 of consecutive slots using a constant third precoding setting; and
receive data in a predetermined number L0 of subsequent consecutive slots using a constant fourth precoding setting,
wherein the third and fourth precoding settings are independently assignable.

15. The receiving node of claim 8, wherein the processing circuitry is configured to receive the data by processing a received signal in accordance with a precoding assumption.

16. The receiving node of claim 8, wherein the receiving node is a user equipment and the transmitting node is a network node.

17. A method by a transmitting node for transmitting data to a receiving node, the method comprising:
when operating in the dynamic bundling size mode:
provide the receiving node with an indication of bundling control information representing at least a number L of slots;
transmit data in L consecutive slots using a constant first precoding setting; and
transmit data in subsequent L consecutive slots using a constant second precoding setting,
wherein the first and second precoding settings are independently assignable.

18. The method of claim 17, wherein:
transmitting the data in the L consecutive slots using the constant first precoding setting comprises transmitting the data in a number K of resource blocks; and
transmitting the data in the subsequent L consecutive slots using the constant second precoding setting comprises transmitting the data in the number K of resource blocks.

19. The method of claim 18, wherein the indication of bundling control information consists of a single bit wherein a first value of the single bit represents a first combination of K and L, and a second value of the single bit represents a second combination of K and L.

20. The method of claim 17, further comprising:
determining that channel state information is not outdated prior to transmitting the bundling control information, and
transmitting the bundling control information in response to determining that the channel state information is not outdated.

21. The method of claim 17, further comprising:
when operating in a static bundling size mode:
transmitting data in a predetermined number L0 of consecutive slots using a constant third precoding setting; and
transmitting data in the predetermined number L0 of subsequent consecutive slots using a constant fourth precoding setting,
wherein the third and fourth precoding settings are independently assignable.

22. The method of claim 21, further comprising:
determining that channel state information is outdated, and
in response to determining that the channel state information is outdated, transmit updated bundling control information to the receiving node to transition the receiving node to the static bundling size mode.

23. The method of claim 17, wherein the transmitting node is a network node and the receiving node is a user equipment.

24. A method by a receiving node for receiving data from a transmitting node, the method comprising:
obtaining an indication of bundling control information representing at least a number L of slots;
in response to obtaining the indication of the bundling control information, operating in a dynamic bundling size mode;
while in the dynamic bundling size mode, receiving data from the transmitting node in L consecutive slots assuming that the transmitting node has applied a constant first precoding setting;
while in the dynamic bundling size mode, receiving data from the transmitting node in subsequent L consecutive slots assuming that the transmitting node has applied a constant second precoding setting,
wherein the first and second precoding settings are independently assignable.

25. The method of claim 24, further comprising:
performing channel estimation on the L consecutive slots to form a first joint channel estimate for the L consecutive slots; and
performing channel estimation on the subsequent L consecutive slots to form a second joint channel estimate for the subsequent L consecutive slots.

26. The method of claim 24, wherein the bundling control information further represents a number K of resource blocks, and the method further comprises:
receiving data in K resource blocks and the L consecutive slots using the constant first precoding setting; and
receiving data in K resource blocks and the subsequent L consecutive slots using the constant second precoding setting.

* * * * *